(12) United States Patent
Saiki (10) Patent No.: US 11,558,521 B2
(45) Date of Patent: Jan. 17, 2023

(54) IMAGE FORMING APPARATUS IMPROVED IN SETTING PROCESS FOR RECORDING MEDIUM, METHOD OF CONTROLLING THE SAME, AND STORAGE MEDIUM

(71) Applicant: CANON KABUSHIKI KAISHA, Tokyo (JP)

(72) Inventor: Kenji Saiki, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/400,205

(22) Filed: Aug. 12, 2021

(65) Prior Publication Data

US 2021/0377410 A1  Dec. 2, 2021

Related U.S. Application Data

(63) Continuation of application No. 15/083,651, filed on Mar. 29, 2016, now Pat. No. 11,122,178.

(30) Foreign Application Priority Data

Apr. 1, 2015 (JP) ................................. 2015-075122

(51) Int. Cl.
  *H04N 1/00* (2006.01)

(52) U.S. Cl.
  CPC ....... *H04N 1/00724* (2013.01); *H04N 1/0032* (2013.01); *H04N 1/0057* (2013.01); *H04N 1/00726* (2013.01); *H04N 2201/0094* (2013.01)

(58) Field of Classification Search
  CPC ........ G03G 15/00; G03G 21/00; G03G 15/08; G03G 15/20; G03G 21/14; G03G 15/23;
  (Continued)

(56) References Cited

U.S. PATENT DOCUMENTS 1,122,178 A * 12/1914 Ward et al. ............... F04F 1/06
                                                        417/143
5,201,507 A    4/1993 Tokuda
(Continued)

FOREIGN PATENT DOCUMENTS

JP    H08267851 A    10/1996
JP    H11170665 A     6/1999
(Continued)

OTHER PUBLICATIONS

Office Action issued in Japanese Appln. No. 2015-075122 dated Jan. 22, 2019.
(Continued)

*Primary Examiner* — Negussie Worku
(74) *Attorney, Agent, or Firm* — Rossi, Kimms & McDowell LLP (57) ABSTRACT

An image forming apparatus improved in a setting process for a recording medium to thereby make it possible to prevent print processing from failing to be executed. In the image forming apparatus including a plurality of sheet feeders for storing recording sheets, when recording sheets are stored in one of the sheet feeders, at least one of the recording sheets is conveyed from the corresponding sheet feeder, and the type of the conveyed recording sheet is identified. Then, the identified type of the recording sheet is set as the type of the stored recording sheets. This makes it possible to prevent occurrence of a situation in which print processing is not executed because the identified type of the recording sheet does not match the set type of the recording sheets, whereby it is possible to prevent print processing from failing to be executed.

11 Claims, 7 Drawing Sheets

(58) Field of Classification Search
CPC . G03G 21/18; B41J 11/66; B41J 11/70; B41J 13/00; B65H 1/18; B65H 1/26; B65H 39/00; B65H 7/06; B65H 7/18; B65H 7/20; H04N 1/00; H04N 1/04; H04N 1/21; H04N 1/387; H04N 1/40; H04N 1/56
USPC .......................................................... 399/16
See application file for complete search history.

(56) References Cited

U.S. PATENT DOCUMENTS

| | | | |
|---|---|---|---|
| 5,673,907 A | 10/1997 | Rumsey | |
| 6,058,249 A * | 5/2000 | Matsuda | H04N 1/32502 358/1.14 |
| 6,668,144 B2 | 12/2003 | Maruyama | |
| 6,718,145 B2 | 4/2004 | Ohta | |
| 7,284,753 B2 | 10/2007 | Kotani | |
| 7,983,584 B2 * | 7/2011 | Okamoto | G03G 15/5029 399/82 |
| 10,921,740 B2 * | 2/2021 | Sasaki | B41J 29/38 |
| 2002/0033368 A1 * | 3/2002 | Nasu | C02F 1/5245 210/720 |
| 2002/0186979 A1 * | 12/2002 | Ohta | G03G 15/5029 399/45 |
| 2007/0025745 A1 | 2/2007 | Aoki | |
| 2008/0056793 A1 | 3/2008 | Yokoyama | |
| 2008/0219685 A1 | 9/2008 | Muratani | |
| 2009/0136246 A1 | 5/2009 | Murakami | |
| 2010/0111546 A1 | 5/2010 | Kubo | |
| 2010/0118349 A1 | 5/2010 | Ozawa | |
| 2010/0310261 A1 * | 12/2010 | Matsushima | G03G 15/6594 399/16 |
| 2012/0002223 A1 * | 1/2012 | Tanaka | B41J 11/00 358/1.9 |
| 2013/0259606 A1 | 10/2013 | Kayama | |
| 2015/0062635 A1 * | 3/2015 | Anno | G06K 15/4065 358/1.15 |
| 2016/0295045 A1 * | 10/2016 | Saiki | H04N 1/0032 |
| 2018/0373191 A1 | 12/2018 | Doyo | |
| 2019/0324696 A1 * | 10/2019 | Matsuda | H04N 1/00636 |

FOREIGN PATENT DOCUMENTS

| | | |
|---|---|---|
| JP | 2002182518 A | 6/2002 |
| JP | 2003029581 A | 1/2003 |
| JP | 2005067115 A | 3/2005 |
| JP | 2006175611 A | 7/2006 |
| JP | 2007055814 A | 3/2007 |
| JP | 2010145513 A | 7/2010 |
| JP | 2010217742 A | 9/2010 |
| JP | 2012012219 A | 1/2012 |
| JP | 2013134460 A | 7/2013 |
| JP | 2014168914 A | 9/2014 |

OTHER PUBLICATIONS

Office Action issued in Japanese Appln. No. 2015-075122 dated Aug. 27, 2019.
Office Action issued in Japanese Appln No. 2020-075964 dated May 11, 2021.
Office Action issued in U.S. Appl. No. 15/083,651 dated Mar. 23, 2017.
Office Action issued in U.S. Appl. No. 15/083,651 dated Oct. 3, 2017.
Office Action issued in U.S. Appl. No. 15/083,651 dated Sep. 21, 2018.
Office Action issued in U.S. Appl. No. 15/083,651 dated May 21, 2019.
Notice of Allowance issued in U.S. Appl. No. 15/083,651 dated May 21, 2021.

* cited by examiner

| RECORDING SHEET TYPE SETTING |
|---|
| RECORDING SHEET TYPE SETTING OF SHEET FEEDER 301 |
| RECORDING SHEET TYPE SETTING OF SHEET FEEDING CASSETTE 302a |
| RECORDING SHEET TYPE SETTING OF SHEET FEEDING CASSETTE 302b |
| RECORDING SHEET TYPE SETTING OF SHEET FEEDING CASSETTE 302c |

FIG. 5B

| RECORDING SHEET TYPE SETTING OF CASSETTE 2 |
|---|
| PLAIN PAPER |
| THICK PAPER |
| THIN PAPER |
| AUTOMATIC SETTING |

FIG. 5C

| Processing in progress. |
|---|
| MFP is detecting a recording sheet type. Several blank sheets will be output. |

IMAGE FORMING APPARATUS IMPROVED IN SETTING PROCESS FOR RECORDING MEDIUM, METHOD OF CONTROLLING THE SAME, AND STORAGE MEDIUM

BACKGROUND OF THE INVENTION

Field of the Invention

The present invention relates to an image forming apparatus improved in a setting process for a recording medium, a method of controlling the same, and a storage medium.

Description of the Related Art

In recent years, recording media used for printing have become diversified. To obtain a printed outcome satisfying a certain quality level even when any recording medium is used for printing, there has been proposed an image forming apparatus that detects the type of a recording medium used for printing, using a sensor, sets printing conditions, such as a fixing temperature and a speed of conveying each sheet of the recording medium, according to the detected type of the recording medium, and executes print processing based on the set printing conditions (see e.g. Japanese Patent Laid-Open Publication No. 2002-182518).

Further, there has been proposed an image forming apparatus that is configured such that the type of a recording medium to be used for printing is detected by a sensor when executing print processing, and the type of the recording medium stored in a sheet feeding tray is set by a user in advance (see e.g. Japanese Patent Laid-Open Publication No. 2012-012219). In the image forming apparatus disclosed in Japanese Patent Laid-Open Publication No. 2012-012219, when the type of the recording medium detected by the sensor (hereinafter referred to as the "detected type") matches the type of the recording medium set for the image forming apparatus by the user in advance (hereinafter referred to as the "set type"), print processing is executed.

Incidentally, in the image forming apparatus disclosed in Japanese Patent Laid-Open Publication No. 2012-012219, when the sensor detects the type of a recording medium, it sometimes happens that the sensor makes an error in detecting the type of the recording medium. Further, when the user sets the type of a recording medium for the image forming apparatus in advance, the user may make a mistake in setting the type of the recording medium.

However, in the image forming apparatus disclosed in Japanese Patent Laid-Open Publication No. 2012-012219, when the detected type does not match the set type, print processing is not automatically executed. Therefore, there is a problem that when the sensor has made an error in detecting the type of a recording medium, or the user made a mistake in setting the type of the recording medium, print processing is not executed, unless the user gives a specific instruction, for example, an instruction for continuing the print processing.

SUMMARY OF THE INVENTION

The present invention provides an image forming apparatus that is improved in a setting process for a recording medium to thereby make it possible to prevent print processing from failing to be executed, a method of controlling the image forming apparatus, and a storage medium.

In a first aspect of the present invention, there is provided an image forming apparatus comprising a storage unit configured to store a recording medium, an identification unit configured to convey, in response to storage of the recording medium in the storage unit, at least one sheet of the recording medium from the storage unit, and identify the type of the recording medium, which is conveyed, and a setting unit configured to set the identified type of the recording medium as the type of the stored recording medium.

In a second aspect of the present invention, there is provided a method of controlling an image forming apparatus including a storage unit configured to store a recording medium, comprising conveying at least one sheet of the recording medium from the storage unit in response to storage of the recording medium in the storage unit, and identifying the type of the recording medium, which is conveyed, and setting the identified type of the recording medium as the type of the stored recording medium.

In a third aspect of the present invention, there is provided a non-transitory computer-readable storage medium storing a computer-executable control program for causing a computer to execute a method of controlling an image forming apparatus including a storage unit configured to store a recording medium, wherein the method comprises conveying at least one sheet of the recording medium from the storage unit in response to storage of the recording medium in the storage unit, and identifying the type of the recording medium, which is conveyed, and setting the identified type of the recording medium as the type of the stored recording medium.

According to the present invention, it is possible to prevent print processing from failing to be executed by improving the setting process for a recording medium.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
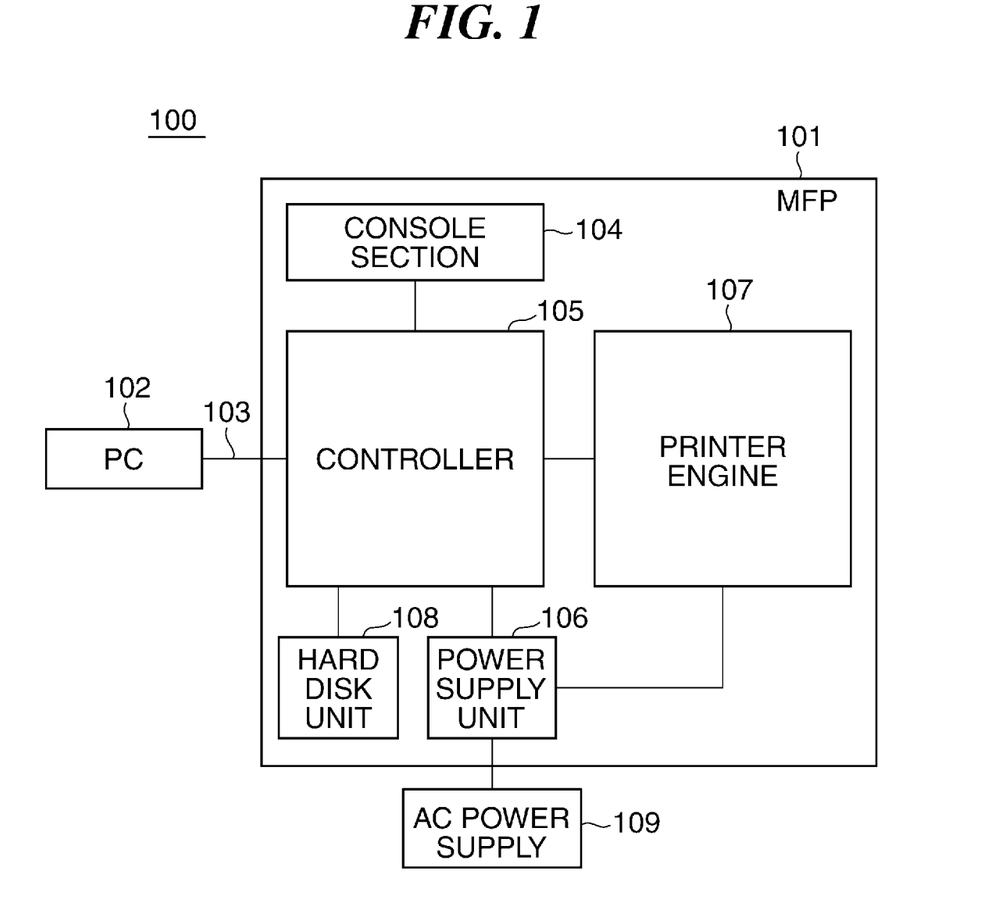
FIG. 1 is a schematic block diagram of an image forming system including an MFP as an image forming apparatus according to an embodiment of the present invention.

FIG. 1 is a schematic block diagram of an image forming system 100 including an MFP 101 as an image forming apparatus according to an embodiment of the present invention.

The image forming system 100 shown in FIG. 1 includes the MFP 101 and a PC 102 as an information processing apparatus, and the MFP 101 and the PC 102 are connected to each other via a network, such as a LAN 103. The MFP 101 includes a console section 104, a controller 105, a power supply unit 106, a printer engine 107, and a hard disk unit 108, and the console section 104, the power supply unit 106, the printer engine 107, and the hard disk unit 108 are interconnected via the controller 105. Further, the printer engine 107 is connected to the power supply unit 106, and the power supply unit 106 is connected to an AC power supply 109.

The console section 104 includes hard keys and an operation panel, and a user inputs an instruction to the MFP 101 by operating the hard keys and the operation panel (reception of an instruction from the user). The controller 105 controls the MFP 101. AC power is supplied from the AC power supply 109 to the power supply unit 106. The power supply unit 106 converts the supplied AC power to DC power, and supplies the converted DC power to the components of the MFP 101. The printer engine 107 prints e.g. image data stored in the hard disk unit 108 on a recording sheet S as a recording medium. The hard disk unit 108 is a nonvolatile storage device, and stores various programs, various data, etc.

Figure 2:
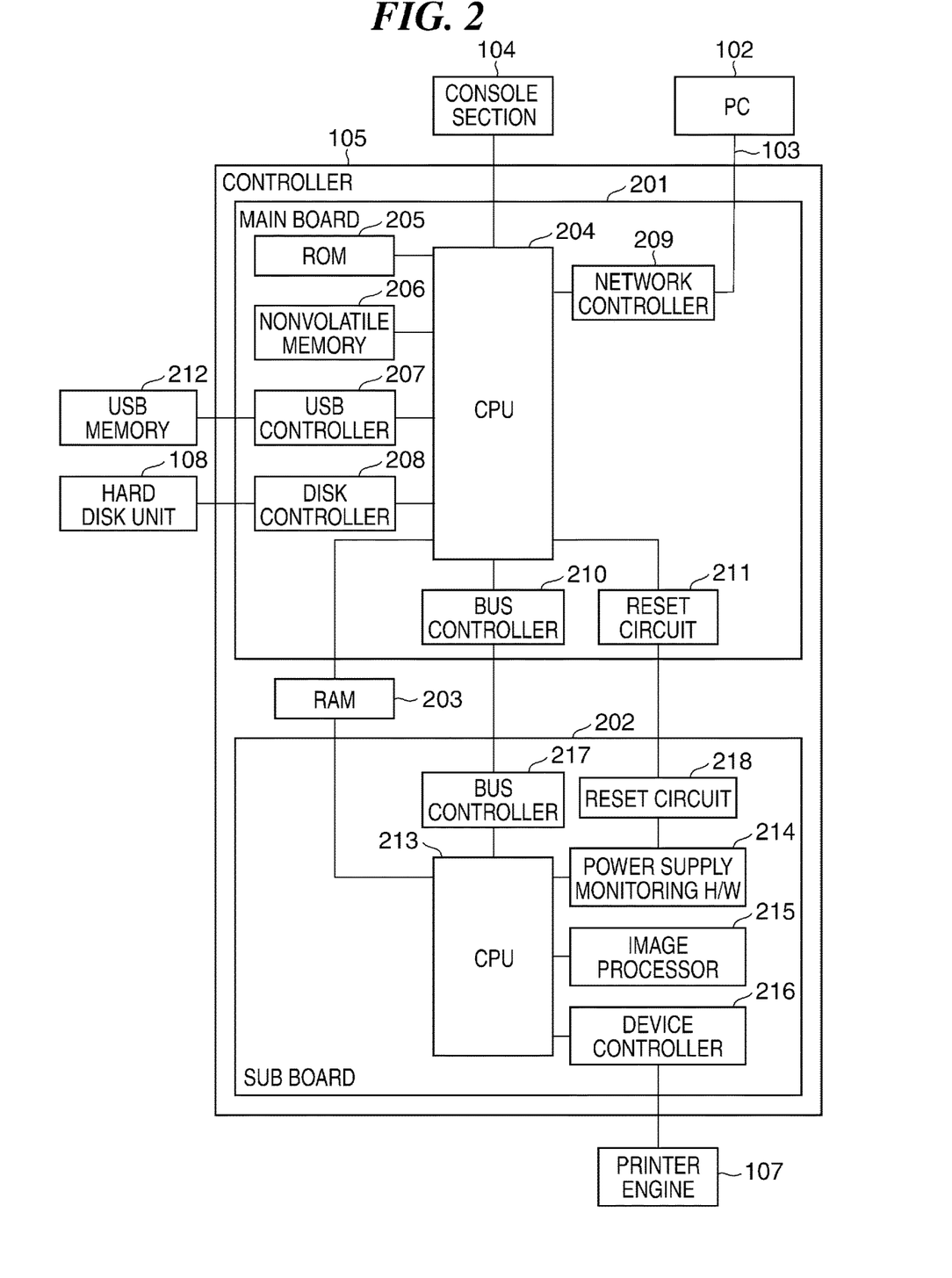
FIG. 2 is a schematic block diagram of a controller of the MFP appearing in FIG. 1.

FIG. 2 is a schematic block diagram of the controller 105 appearing in FIG. 1.

The controller 105 shown in FIG. 2 includes a main board 201, a sub board 202, and a RAM 203. The main board 201 includes a CPU 204, a ROM 205, a nonvolatile memory 206, a USB controller 207, a disk controller 208, a network controller 209, a bus controller 210, and a reset circuit 211, and the components 104, and 205 to 211 are interconnected by a bus, not shown, via the CPU 204. Further, a USB memory 212, the hard disk unit 108, and the PC 102 are connected to the USB controller 207, the disk controller 208, and the network controller 209, respectively.

The sub board 202 includes a CPU 213, a power supply monitoring hardware (H/W) 214, an image processor 215, a device controller 216, a bus controller 217, and a reset circuit 218, and the power supply monitoring hardware 214, the image processor 215, the device controller 216, and the bus controller 217 are interconnected by a bus, not shown, via the CPU 213, and the reset circuit 218 is connected to the power supply monitoring hardware 214. Further, the printer engine 107 is connected to the device controller 216. Furthermore, the CPU 213 is connected to the CPU 204 via the RAM 203, the bus controller 217 is connected to the bus controller 210, and the reset circuit 218 is connected to the reset circuit 211.

The RAM 203 can be accessed from the CPU 204 or the CPU 213, and is used as a main memory for each of the CPU 204 and the CPU 213. The CPU 204 controls the console section 104 and the components of the main board 201. The ROM 205 stores programs operated by the CPU 204 and the CPU 213. The nonvolatile memory 206 stores various conditions set for the MFP 101 and information on the number of recording sheets S which have been used for printing (counter information). The USB controller 207 controls the USB memory 212 storing various data. The disk controller 208 controls the hard disk unit 108. The network controller 209 transmits or receives data to or from the PC 102. The bus controller 210 constitutes a bus bridge between the main board 201 and the sub board 202. The reset circuit 211 initializes the components of the main board 201.

The CPU 213 controls the components of the sub board 202. The power supply monitoring hardware 214 controls electric power supplied to the components of the controller 105. Further, when the CPU 213 starts to normally operate, the power supply monitoring hardware 214 restarts the components of the main board 201 and the components of the sub board 202 via the reset circuit 211 and the reset circuit 218, respectively. Furthermore, when electric power is not supplied to the CPU 213, the power supply monitoring hardware 214 supplies electric power to the components of the controller 105, using an input to a power switch, not shown, as a trigger. The image processor 215 converts e.g. image data described in an image description language to bitmap image data. The device controller 216 controls the printer engine 107. The bus controller 217 constitutes the bus bridge between the main board 201 and the sub board 202, together with the bus controller 210. The reset circuit 218 initializes the components of the sub board 202.

Figure 3:
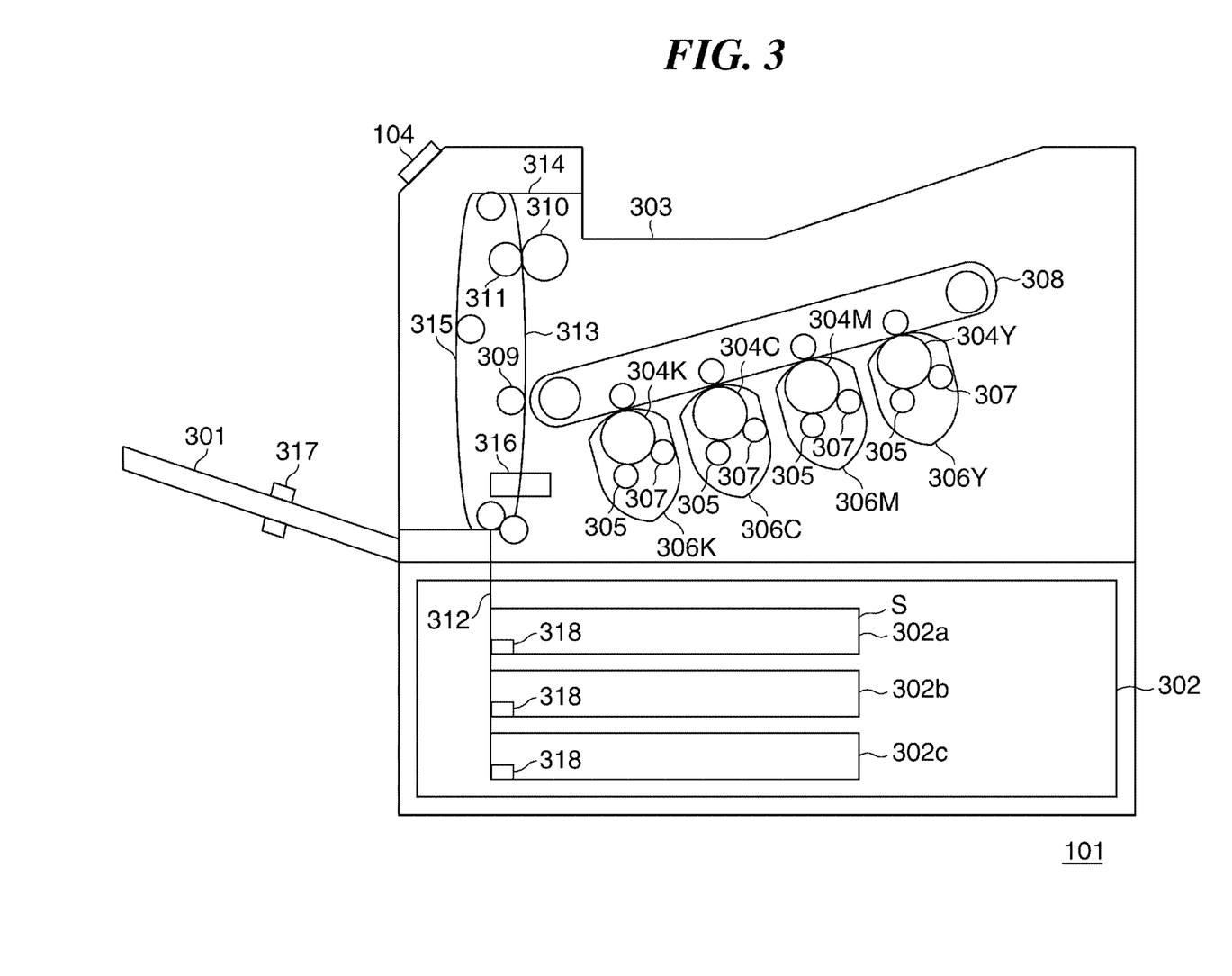
FIG. 3 is a diagram useful in explaining how the MFP appearing in FIG. 1 performs printing of image data on a recording sheet.

FIG. 3 is a diagram useful in explaining how the MFP 101 appearing in FIG. 1 performs printing of image data on recording sheet S.

The MFP 101 shown in FIG. 3 includes sheet feeding sections 301 and 302 (storage unit), a discharge tray 303, photosensitive drums 304Y, 304M, 304C, and 304K, charging rollers 305, toner cartridges 306Y, 306M, 306C, and 306K, developing rollers 307, a transfer belt 308, a transfer section 309, a fixing roller 310, a pressure roller 311, paths 312 to 315, and a sensor 316 (identification unit).

The sheet feeding sections 301 and 302 supply recording sheets S into the MFP 101. The sheet feeding section 301 is a so-called manual feed tray, on which recording sheets S are set. Further, the sheet feeding section 301 is provided with a sensor 317 which detects placement of recording sheets S on the sheet feeding section 301. The sheet feeding section 302 includes sheet feeding cassettes 302a, 302b, and 302c, each of which accommodates recording sheets S. Further, the sheet feeding cassettes 302a, 302b, and 302c are each provided with a sensor 318, and the sensor 318 detects opening and closing of an associated one of the sheet feeding cassettes 302a, 302b, and 302c. When opening and closing of one of the sheet feeding cassettes 302a, 302b, and 302c is detected, this indicates a possibility that the recording sheets S in the corresponding cassette have been replaced and the type of the recording sheets S set therein has been changed. Each recording sheet S on which image data has been printed is discharged onto the discharge tray 303.

Laser emitting sections, not shown, irradiate the photosensitive drums 304Y, 304M, 304C, and 304K, which have been charged by respective charging sections each including the charging roller 305, with laser beams associated with the respective colors of yellow (Y), magenta (M), cyan (C), and black (K). As a result, electrostatic latent images are formed on the photosensitive drums 304Y, 304M, 304C, and 304K, respectively, and the electrostatic latent images are developed with toners of respective colors supplied from the toner cartridges 306Y, 306M, 306C, and 306K, by respective developing devices each including the developing roller 307, whereby toner images are generated on the photosensitive drums 304Y, 304M, 304C, and 304K, respectively.

The generated toner images are transferred onto the transfer belt 308 to form a color image, and the color image formed on the transfer belt 308 is transferred onto a recording sheet S at the transfer section 309. The color image transferred onto the recording sheet S is fixed to the recording sheet S by the fixing roller 310 and the pressure roller 311. The recording sheet S has a front side and a reverse side. When image data is printed on the front side of a recording sheet S accommodated e.g. in the sheet feeding cassette 302a, the MFP 101 conveys the recording sheet S through the paths 312, 313, and 314, prints the image data on the front side of the recording sheet S, and then discharges the recording sheet S onto the discharge tray 303.

Further, when image data is printed on the both sides of the recording sheet S accommodated e.g. in the sheet feeding cassette 302a, the MFP 101 conveys the recording sheet S through the paths 312, 313, and 314, thereby printing the image data on the front side of the recording sheet S, and then switches back the recording sheet S at the path 314, whereafter the MFP 101 further conveys the recording sheet S through the paths 315, 313, and 314, thereby printing the image data on the reverse side of the recording sheet S, and then discharges the recording sheet S onto the discharge tray 303. The sensor 316 detects at least one of the size of each recording sheet S, smoothness thereof, an amount of light reflected therefrom, and an amount of light transmitted therethrough (hereinafter referred to as "type identifying information"). The type identifying information is used to identify the type of a recording sheet S. More specifically, type identifying information stored in advance in the hard disk unit 108 in association with each type of recording sheets S and type identifying information detected by the sensor 316 are compared with each other, whereby the type of the recording sheet S is identified.

Figure 4:
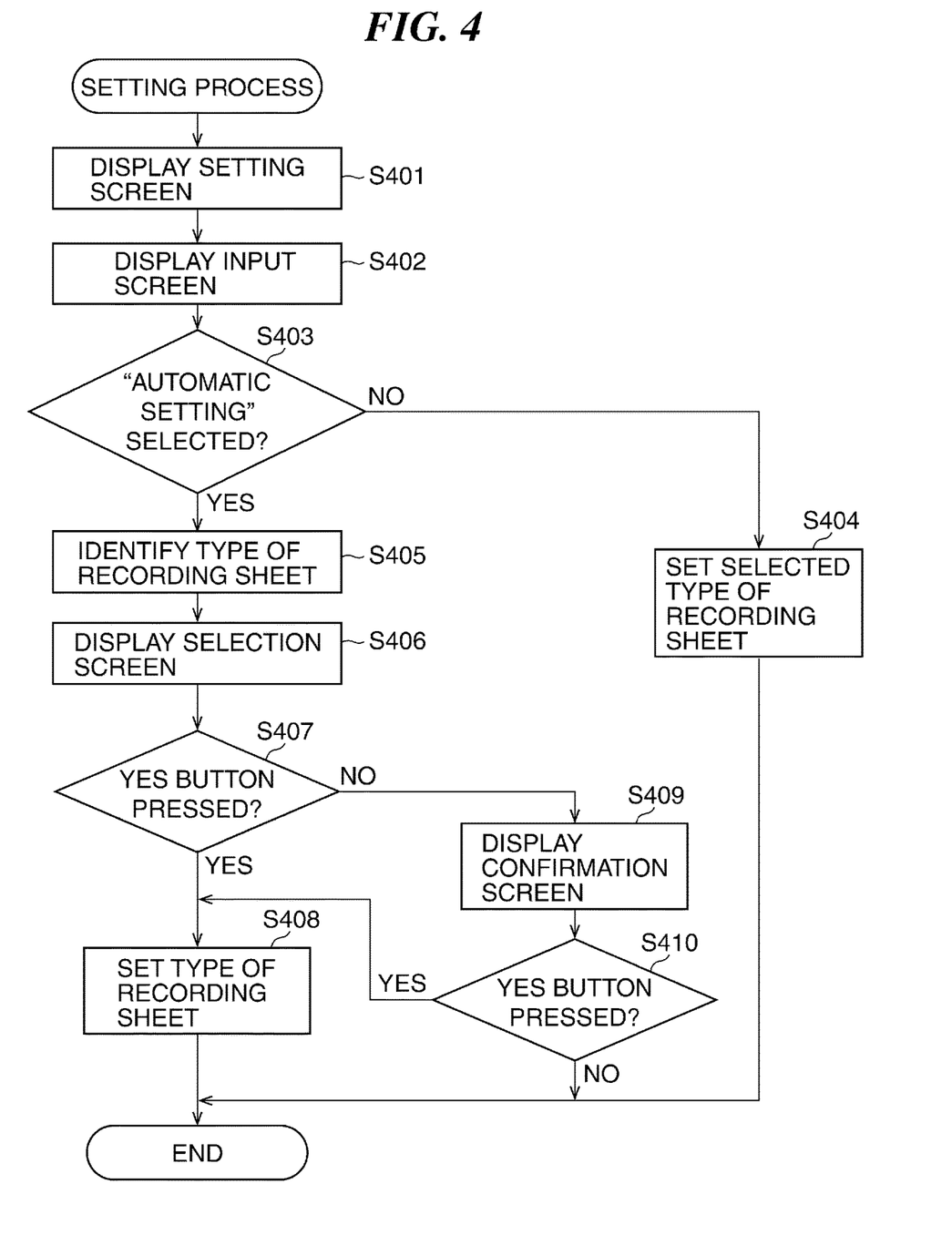
FIG. 4 is a flowchart of a setting process performed by a CPU included in a main board appearing in FIG. 2.

FIG. 4 is a flowchart of a setting process performed by the CPU 204 included in the main board 201 appearing in FIG. 2, through execution of a program stored in the ROM 205 or the hard disk unit 108.

Figure 5A:
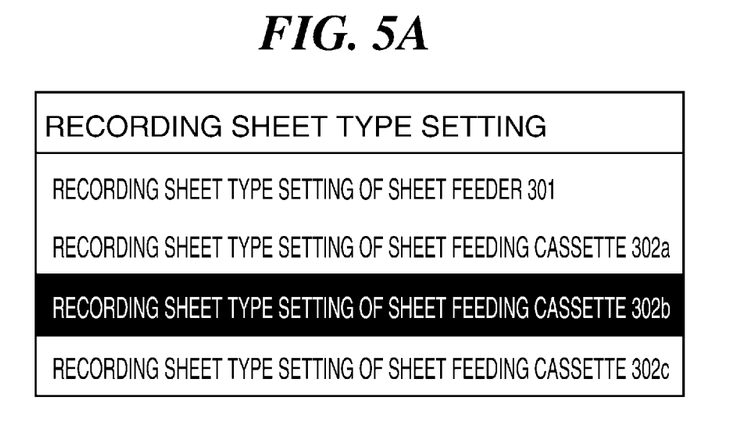
FIGS. 5A to 5E are diagrams useful in explaining various screens displayed on a console section in the setting process in FIG. 4.

Referring to FIG. 4, first, a setting screen (see FIG. 5A) for setting the type of recording sheets S is displayed on the console section 104 for prompting the user to set the type of recording sheets S set on the sheet feeding section 301 or stored in one of the sheet feeding cassettes 302a, 302b, and 302c (step S401). The user selects, on the setting screen displayed on the console section 104, one of the sheet feeding section 301 and the sheet feeding cassettes 302a, 302b, and 302c, to set the type of recording sheets S therefor. Here, it is assumed that "RECORDING SHEET TYPE SETTING OF SHEET FEEDING CASSETTE 302b:" is selected on the setting screen.

Figure 5B:
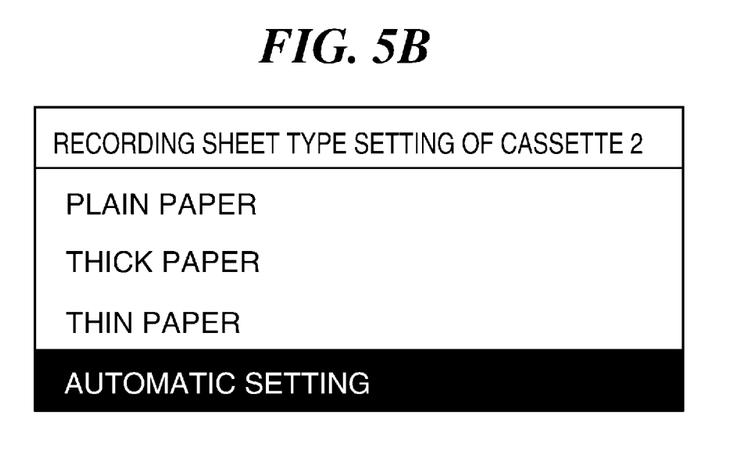
Figure 5C:
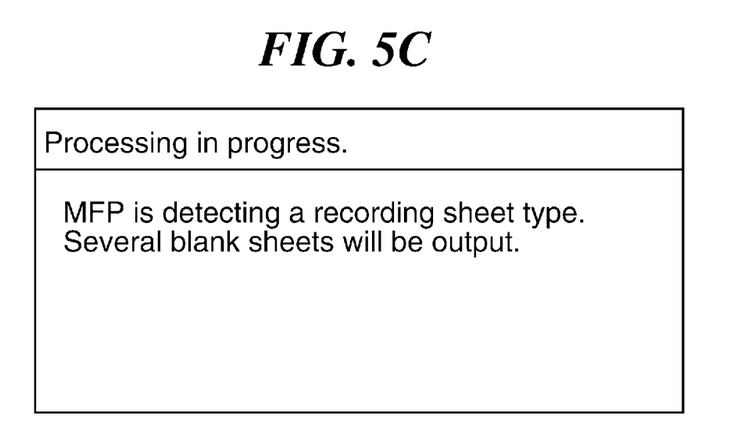

Then, an input screen (see FIG. 5B) for inputting the type of recording sheets S is displayed on the console section 104 (step S402), and the CPU 204 determines whether or not "AUTOMATIC SETTING" displayed on the input screen is selected (step S403). If it is determined in the step S403 that not "AUTOMATIC SETTING", but one of "PLAIN PAPER", "THICK PAPER", and "THIN PAPER", which are displayed on the input screen, is selected, the CPU 204 sets the selected type as the type of the recording sheets S accommodated in the sheet feeding cassette 302b, and stores information associating the set type of the recording sheets S and the sheet feeding cassette 302b (hereinafter referred to as the "setting information") in the nonvolatile memory 206 (step S404), followed by terminating the present process. On the other hand, if "AUTOMATIC SETTING" is selected, one of the recording sheets S is conveyed from the sheet feeding cassette 302b to the sensor 316, the sensor 316 detects the type identifying information of the conveyed recording sheet S, and the CPU 204 identifies the type of the recording sheet S based on the detected type identifying information (step S405). Note that the plurality of recording sheets S may be conveyed so as to increase the accuracy of detection, as illustrated in FIG. 5C.

A notification screen (see FIG. 5C) for notifying the user that the sensor 316 is detecting the type identifying information is displayed on the console section 104 while the sensor 316 is detecting the type identifying information, and the recording sheet S from which the type identifying information has been detected is discharged onto the discharge tray 303 (discharge of the sheet out of the MFP 101).

Although in this description of the step S405, the type of the recording sheet S is identified based on the type identifying information detected from one recording sheet S, the type of the recording sheet S may be identified, as mentioned above, based on the type identifying information detected from a plurality of recording sheets S so as to more accurately identify the type of the recording sheet S.

Figure 5D:
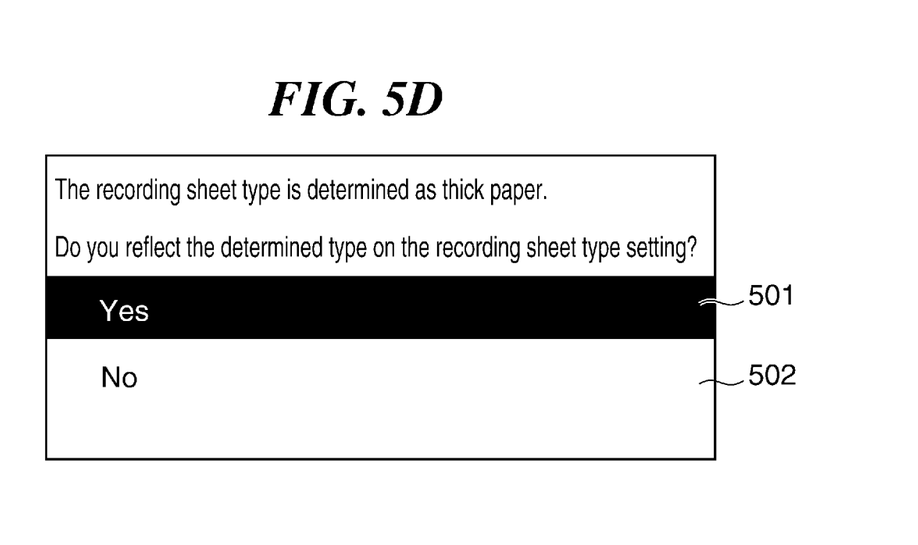

Then, the CPU 204 displays on the console section 104 a selection screen (see FIG. 5D) showing that the identified type of the recording sheet S is e.g. "THICK PAPER", and prompting the user to select whether or not to set "THICK PAPER", i.e. the identified type of the recording sheet S, as the type of recording sheets S accommodated in the sheet feeding cassette 302b (step S406). The selection screen includes a YES button 501 for the user to press when he/she sets the identified and displayed type of the recording sheet S as the type of the recording sheets S accommodated in the sheet feeding cassette 302b, and a NO button 502 for the user to press when he/she does not set the identified type of the recording sheet S as the type of the recording sheets S accommodated in the sheet feeding cassette 302b.

Figure 5E:
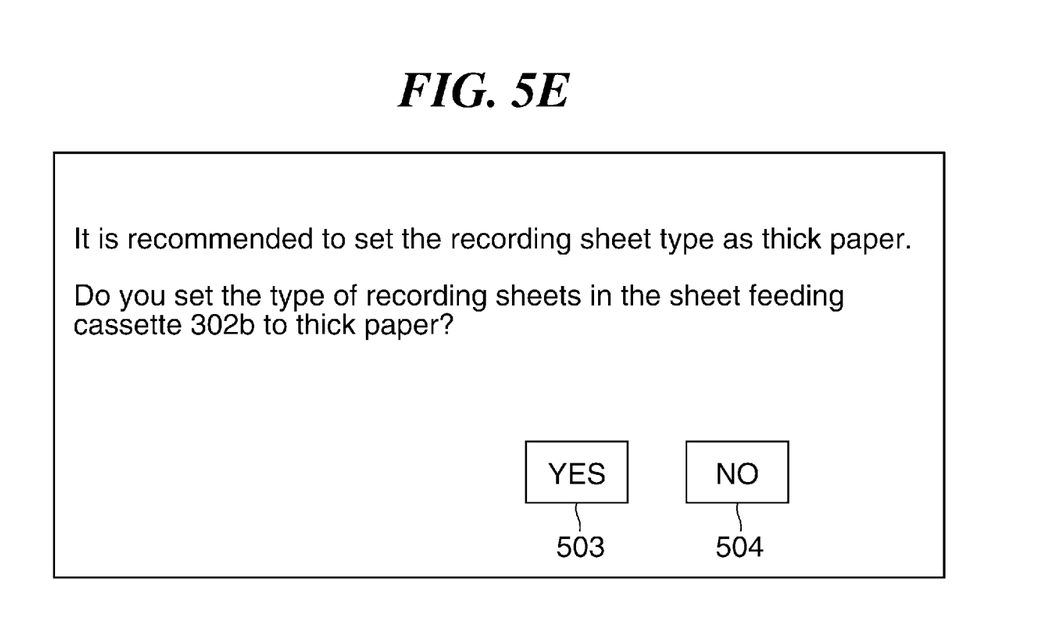

Then, the CPU 204 determines whether or not the YES button 501 has been pressed (step S407). If it is determined in the step S407 that the YES button 501 has been pressed, the CPU 204 sets the type of the recording sheets S accommodated in the sheet feeding cassette 302b, in the setting information, to "THICK PAPER", and stores the setting information thus set, in the nonvolatile memory 206 (step S408), followed by terminating the present process. On the other hand, if the YES button 501 has not been pressed (i.e. if the NO button 502 has been pressed), the CPU 204 displays a confirmation screen (see FIG. 5E) on the console section 104, for advising the user to set the type of recording sheets S accommodated in the sheet feeding cassette 302b, in the setting information, to "THICK PAPER" (step S409). The confirmation screen includes a YES button 503 for the user to press when he/she sets the recommended identified type of the recording sheet S as the type of the recording sheets S accommodated in the sheet feeding cassette 302b, and a NO button 504 for the user to press when he/she does not set the recommended identified type as the same. Then, in a step S410, it is determined whether or not the YES button 503 has been pressed. If not the YES button 503 but the NO button 504 has been pressed, the present process is immediately terminated. On the other hand, if the YES button 503 has been pressed (YES to the step S410), the process proceeds to the step S408. Note that, in the step S408, the setting information is stored in the nonvolatile memory 206 together with date and time information indicative of the date and time at which the setting information was stored.

According to the setting process in FIG. 4, when "AUTOMATIC SETTING" displayed on the input screen is selected, the type identifying information of the recording sheet S is detected, the type of the recording sheet S is identified based on the detected type identifying information (step S405), and the identified type of the recording sheet S is set in the setting information as the type of the recording sheets S accommodated in the sheet feeding cassette 302b (step S408). Accordingly, the identified type of the recording sheet S matches the set type of the recording sheets S. This makes it possible to prevent occurrence of a situation in which print processing is not executed because the identified type of the recording sheet S does not match the set type of the recording sheets S, whereby it is possible to prevent print processing from failing to be executed.

Further, in the setting process in FIG. 4, the recording sheet S the type of which has been identified is discharged onto the discharge tray 303, and hence the recording sheet S is prevented from being conveyed back to the sheet feeding section 301 or 302, which makes it possible to reduce the possibility that the recording sheet S causes conveyance failure when the recording sheet S is being conveyed back.

Further, in the setting process in FIG. 4, if the NO button 502 is pressed not to set the identified type of the recording sheet S as the type of recording sheets S set on the sheet feeding section 301 or accommodated in the sheet feeding cassette 302a, 302b or 302c, the confirmation screen (see FIG. 5E) for advising the user to set the recommended identified type of the recording sheet S as the type of recording sheets S set on the sheet feeding section 301 or accommodated in the sheet feeding cassette 302a, 302b or 302c is displayed on the console section 104 (step S409), and hence it is possible to make the user aware that, unless the identified type of the recording sheet S is set as the set type of the set or accommodated recording sheets S, there is a possibility of failing to execute print processing because the identified type of the recording sheet S does not match the set type of the recording sheet S.

Figure 6:
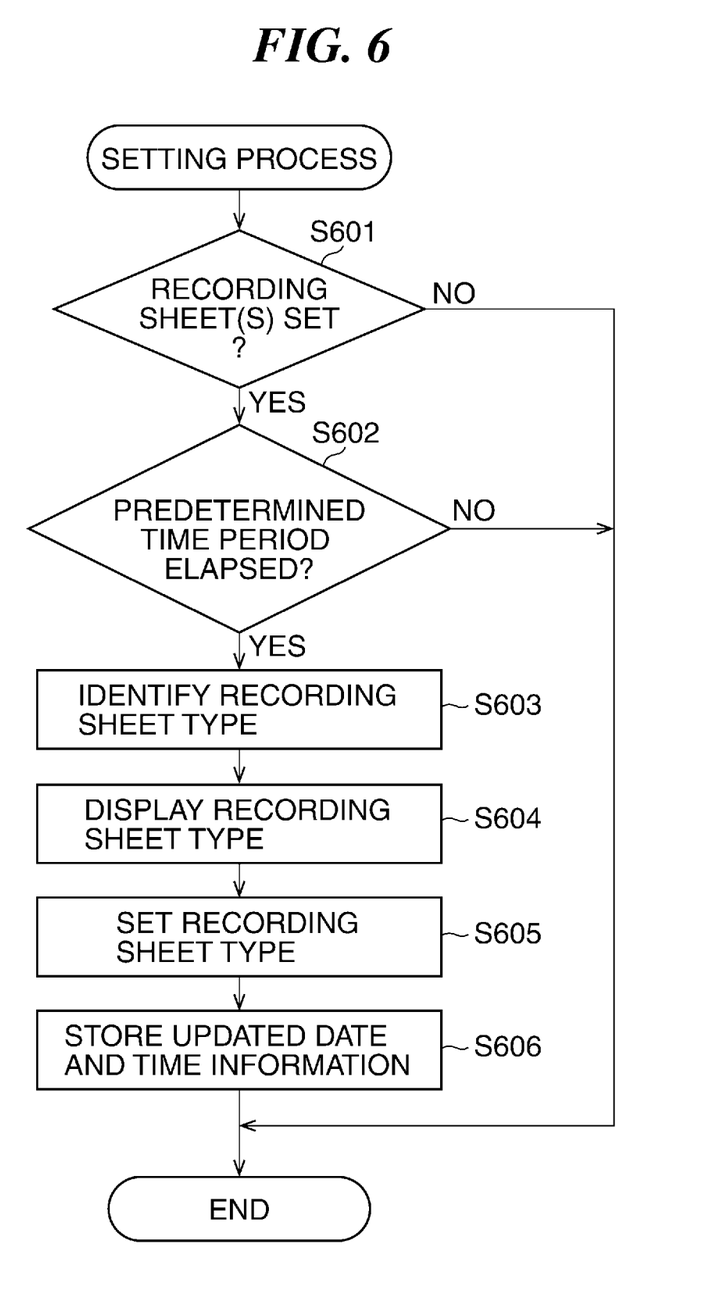
FIG. 6 is a flowchart of a variation of the setting process in FIG. 4.

FIG. 6 is a flowchart of a variation of the setting process in FIG. 4.

Although the setting process in FIG. 4 is started when the user operates the setting screen (shown in FIG. 5A) displayed on the console section 104, the setting process in FIG. 6 is started in response to setting of a recording sheet/recording sheets S on the sheet feeding section 301 or to replacement of recording sheets S accommodated in one of the sheet feeding cassettes 302a, 302b and 302c.

Referring to FIG. 6, first, the CPU 204 determines whether or not setting of any recording sheet S on the sheet feeding section 301 has been detected by the sensor 317 or closing of any of the sheet feeding cassettes 302a, 302b and 302c has been detected by an associated one of the sensors 318 (step S601). If it is determined in the step S601 that no recording sheet S has been detected to be set on the sheet feeding section 301, or none of the sheet feeding cassettes 302a, 302b and 302c has been detected to be closed, the present process is immediately terminated. On the other hand, if any recording sheet S has been detected to be set on the sheet feeding section 301, or one of the sheet feeding cassettes 302a, 302b and 302c has been detected to be closed, the process proceeds to a step S602 described hereafter. In the illustrated example, description of the step S602 et seq. will be given assuming that the recording sheets S in the sheet feeding cassette 302b have been replaced.

Then, the CPU 204 refers to the nonvolatile memory 206, reads out the date and time information which has been stored in the nonvolatile memory 206 together with the setting information of the sheet feeding cassette 302b, and determines whether or not time elapsed from the date and time indicated by the date and time information read from the nonvolatile memory 206 (hereinafter referred to as the "read date and time") to the date and time at which the associated sensor 318 detected the closing of the sheet feeding cassette 302b this time (hereinafter referred to as the "detected date and time") is equal to or longer than a predetermined time period set by the user in advance, in other words, whether or not the predetermined time period has elapsed from the "read date and time", i.e. the time when the sheet feeding cassette 302b was closed last time (step S602).

If it is determined in the step S602 that the predetermined time period has not elapsed from the read date and time, the present process is immediately terminated. On the other hand, if the predetermined time period has elapsed from the read date and time, one recording sheet S is conveyed from the sheet feeding cassette 302b to the sensor 316, to cause the sensor 316 to detect the type identifying information of the conveyed recording sheet S, whereby the CPU 204 identifies the type of the recording sheet S e.g. as "THICK PAPER" (step S603).

Then, the CPU 204 displays on the console section 104 a screen showing that the identified type of the recording sheet S is "THICK PAPER" (step S604), discharges the recording sheet S conveyed to the sensor 316 onto the discharge tray 303, sets the type of recording sheets S accommodated in the sheet feeding cassette 302b, in the setting information, to "THICK PAPER" (step S605), stores the setting information together with date and time information indicative of date and time at which the setting information is stored in the nonvolatile memory 206 (hereinafter referred to as the "updated date and time information") (step S606), followed by terminating the present process.

According to the setting process in FIG. 6, the type of the recording sheet S is identified in response to detection of setting of recording sheet/recording sheets S on the sheet feeding section 301 by the sensor 317 or in response to detection of closing of any of the sheet feeding cassettes 302a, 302b, and 302c by an associated one of the sensors 318 (steps S601 and S603). When the sheet feeding cassette 302b is closed, this indicates a possibility that the recording sheets S have been replaced and the type of the accommodated recording sheets S has been changed. However, since the type of the recording sheets S is identified e.g. in accordance with opening and closing of the sheet feeding cassette 302b, the type of the recording sheets S is identified whenever there occurs the possibility that the type of the accommodated recording sheets S has been changed, and the identified type is set as the type of the recording sheets S accommodated in the sheet feeding cassette 302b. This makes it possible to positively cause the type of the recording sheets S accommodated in the sheet feeding cassette 302b to match the set type of the recording sheets S.

In the above-described setting process in FIG. 6, for example, the type of the recording sheets S is identified only once after opening and closing of the sheet feeding cassette 302b, but the step S603 et seq. may be executed when a predetermined time period further elapses from the date and time indicated by the updated date and time information. That is, the type of recording sheets S may be identified whenever the predetermined time period elapses from the date and time indicated by the updated date and time information (repetition of identification of the type of the recording sheets S). By doing this, the type of the recording sheets S is periodically identified (step S603), and hence it is possible to always cause the identified type of the recording sheets S to match the set type of the recording sheets S. Further, as to a case where the sheet feeding cassette 302b is opened and closed before the predetermined time period elapses from the date and time indicated by the updated date and time information, there is a high possibility that a user opens and closes the sheet feeding cassette 302b, for example, in order to return the recording sheet S discharged onto the discharge tray 303 after identification of the type to the sheet feeding cassette 302b, i.e. that the type of the recording sheets S in the sheet feeding cassette 302b has not been changed. In view of this, if the predetermined time period has not elapsed from the date and time indicated by the updated date and time information, execution of the present process may be inhibited even when the sheet feeding cassette 302b is opened and closed. This makes it possible to prevent identification of the type of the recording sheet S from being unnecessarily executed, and thereby prevent print processing from being unnecessarily interrupted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-075122 filed Apr. 1, 2015, which is hereby incorporated by reference herein in its entirety.

What is claimed is:

1. An image forming apparatus comprising:
a printer;
a plurality of sheet feeding cassettes each configured to store a sheet; and
a processor configured to implement instructions stored in a memory and execute:
an identifying task that, based on a reception of instruction from a user, identifies a type of a sheet conveyed from a sheet feeding cassette designated by the user from among the plurality of sheet feeding cassettes; and
a setting task that sets, as a sheet type of a sheet stored in the designated sheet feeding cassette, the type identified by the identifying task,
wherein the printer does not print an image on the conveyed sheet:
that was subjected to identification of the type of the conveyed sheet by the identifying task; and
to which the identified type has been set as the sheet type stored in the designated sheet feeding cassette by the setting task.

2. The image forming apparatus according to claim 1, wherein the printer prints an image on another sheet conveyed separately from the conveyed sheet subjected to identification of the type of the conveyed sheet, using the sheet typo set by the setting task.

3. The image forming apparatus according to claim 1, wherein the identifying task identifies the type, different from sheet size, of the conveyed sheet.

4. The image forming apparatus according to claim 1, wherein the conveyed sheet subjected to identification of the type of the conveyed sheet is discharged out of the image forming apparatus.

5. The image forming apparatus according to claim 1, wherein the identifying task conveys a sheet in response to closing of the designated sheet feeding cassette.

6. The image forming apparatus according to claim 1, wherein the identifying task conveys a sheet in response to a predetermined time period elapsed after closing of the designated sheet feeding cassette.

7. The image forming apparatus according to claim 1, wherein the processor further executes:
a detecting task that detects information regarding the sheet conveyed from the designated sheet feeding cassette,
wherein the identifying task identifies the type of the conveyed sheet based on the detected information.

8. The image forming apparatus according to claim 7, wherein the information includes at least one of a sheet size, smoothness, an amount of light reflected, or an amount of light transmitted.

9. The image forming apparatus according to claim 1, wherein the identifying task identifies the type of the sheet conveyed from the designated sheet feeding cassette, based on information regarding a plurality of sheets conveyed from the designated sheet feeding cassette.

10. An image forming apparatus comprising:
a printer;
a plurality of sheet feeding cassettes each configured to store a sheet; and
a processor configured to implement instructions stored in a memory and execute:
an identifying task that, based on a reception of instruction from a user, identifies a type of a sheet conveyed from a sheet feeding cassette designated by the user from among the plurality of sheet feeding cassettes; and
a setting task that sets a sheet type of a sheet stored in the designated sheet feeding cassette, based on the type identified by the identifying task,
wherein the printer does not print an image on the conveyed sheet:
that was subjected to identification of the type of the conveyed sheet by the identifying task; and
to which the identified type has been set as the sheet type stored in the designated sheet feeding cassette by the setting task.

11. A control method of an image forming apparatus including a printer and a plurality of sheet feeding cassettes each configured to store a sheet, the control method comprising:
identifying, based on a reception of instruction from a user, a type of a sheet conveyed from a sheet feeding cassette designated by the user from among the plurality of sheet feeding cassettes; and setting, as a sheet type of a sheet stored in the designated sheet feeding cassette, the identified type of the conveyed sheet,
wherein the printer does not print an image on the conveyed sheet:
 that was subjected to identification of the type of the conveyed sheet; and
 to which the identified sheet type has been set as the sheet type stored in the designated sheet feeding cassette.

* * * * *